US012338743B1

(12) United States Patent
Adam et al.

(10) Patent No.: US 12,338,743 B1
(45) Date of Patent: Jun. 24, 2025

(54) GAS TURBINE ENGINES HAVING MOVEABLE INLET GUIDE VANES AND STATOR VANES

(71) Applicant: General Electric Company, Schenectady, NY (US)

(72) Inventors: Matthew F. Adam, Evendale, OH (US); Aamir Shabbir, Westlake, OH (US); Gregory John Kajfasz, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/392,801

(22) Filed: Dec. 21, 2023

(51) Int. Cl.
*F01D 17/16* (2006.01)

(52) U.S. Cl.
CPC ........... *F01D 17/16* (2013.01); *F01D 17/162* (2013.01); *F05D 2240/12* (2013.01)

(58) Field of Classification Search
CPC ........ F01D 17/162; F04D 29/563; F02C 9/20; F02C 9/22
See application file for complete search history.

(56) References Cited

U.S. PATENT DOCUMENTS 2,689,680 A 8/1950 Lovesey
3,850,544 A * 11/1974 Ciokajlo ............... F01D 17/162 415/149.4
4,254,619 A 3/1981 Griffin, III et al.
5,281,087 A 1/1994 Hines
6,619,916 B1 9/2003 Capozzi et al.
7,922,445 B1 * 4/2011 Pankey ................... F01D 17/20 415/160
7,942,632 B2 5/2011 Lord et al.
8,348,600 B2 1/2013 Norris et al.
9,249,736 B2 2/2016 Carroll
10,781,707 B2 9/2020 Dyer et al.
2010/0260591 A1 10/2010 Martin et al.
2016/0312650 A1 * 10/2016 Siebert .................. F04D 29/563
2020/0325852 A1 4/2020 Sidelkovskiy et al.

FOREIGN PATENT DOCUMENTS

EP 1571298 A1 * 7/2005
KR 10-2019-0048773 A * 5/2019

OTHER PUBLICATIONS

English machine translation of KR-10-2019-0048773-A, Apr. 20, 2024.*
English machine translation of EP-1571298-A1, Apr. 20, 2024.*

* cited by examiner

*Primary Examiner* — Christopher Verdier
(74) *Attorney, Agent, or Firm* — Hanley, Flight & Zimmerman, LLC

(57) ABSTRACT

Gas turbine engines having moveable inlet guide vanes and stator vanes are described herein. An example gas turbine engine includes a casing defining a flow passageway to a compressor. The casing includes an outer radial wall and an inner radial wall. The compressor includes alternating stages of rotor blades and stator vanes in the flow passageway. The gas turbine engine also includes an inlet guide vane in the flow passageway upstream of a first stage of rotor blades of the compressor. The inlet guide vane extends between the outer radial wall and the inner radial wall. The inlet guide vane includes an outer radial panel coupled to the outer radial wall, an inner radial panel coupled to the inner radial wall, and a middle panel between the outer radial panel and the inner radial panel. The middle panel is rotatable relative to the outer and inner radial panels.

14 Claims, 6 Drawing Sheets

GAS TURBINE ENGINES HAVING MOVEABLE INLET GUIDE VANES AND STATOR VANES

FIELD OF THE DISCLOSURE

The present disclosure relates generally to aircraft engines and, more particularly, to gas turbine engines having moveable inlet guide vanes and stator vanes.

BACKGROUND

Aircraft engines (e.g., turbofan engines, turboprop engines, etc.) typically include a fan and a gas turbine engine (sometimes referred to as an engine core) to drive the fan to produce thrust. The gas turbine engine includes one or more compressor(s), a combustor, and one or more turbine(s) in a serial flow arrangement. The compress(s) may include one or more stages of rotor blades and stator vanes. Some gas turbine engines include inlet guide vanes (IGVs) upstream of the first stage of rotor blades. The IGVs are angled relative to the axial direction, which causes the air to swirl into the first stage of rotor blades.

BRIEF DESCRIPTION OF THE DRAWINGS

A full and enabling disclosure of the presently described technology, including the best mode thereof, directed to one of ordinary skill in the art, is set forth in the specification, which makes reference to the appended FIGS., in which.

The figures are not to scale. Instead, the thickness of regions may be enlarged in the drawings. In general, the same reference numbers will be used throughout the drawing(s) and accompanying written description to refer to the same or like parts.

DETAILED DESCRIPTION

Figure 1:
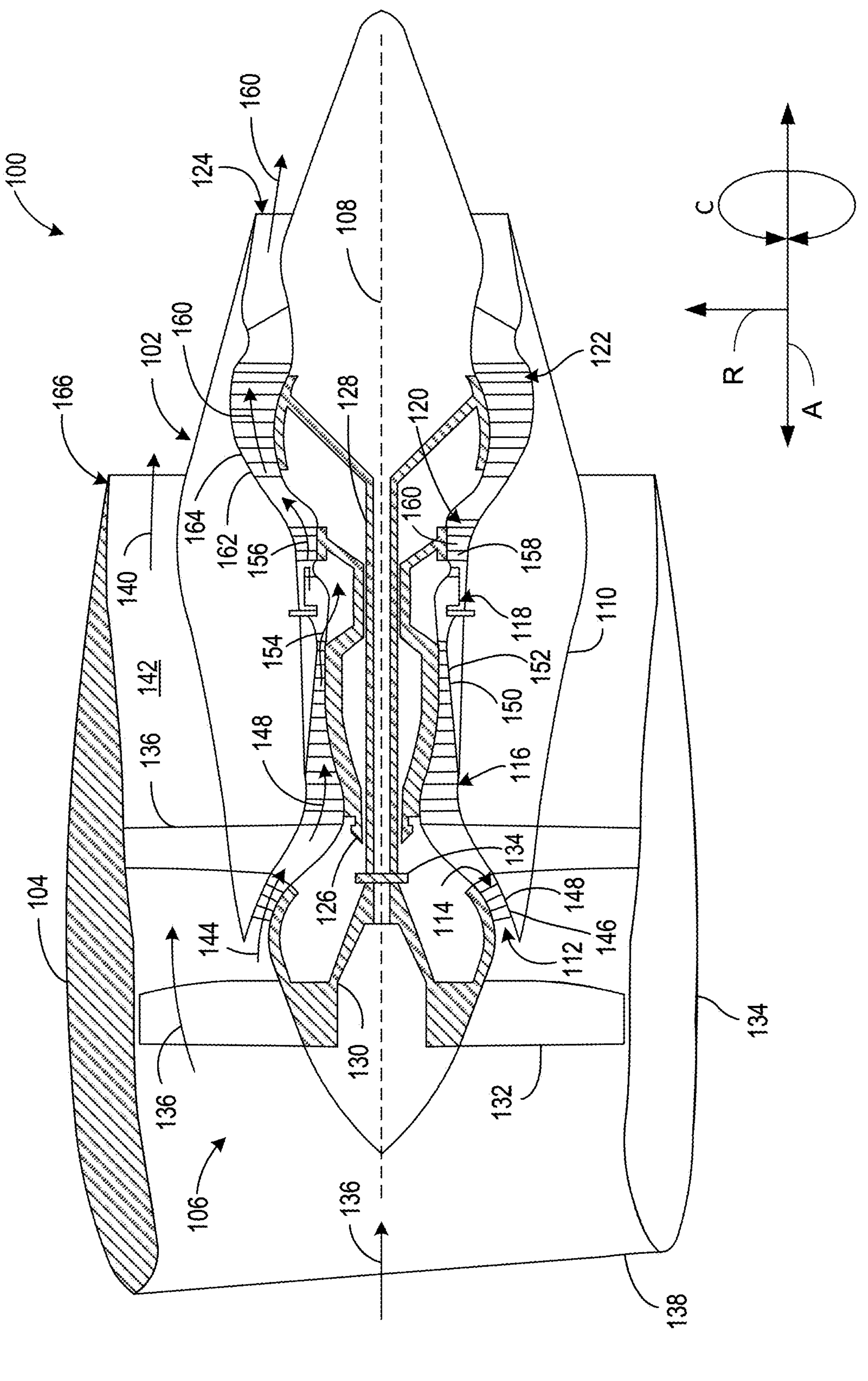
FIG. 1 is a schematic cross-sectional view of an example turbofan engine having an example gas turbine engine in which examples disclosed herein can be implemented.

Reference now will be made in detail to examples or embodiments of the presently described technology, one or more examples of which are illustrated in the drawings. Each example or embodiment is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one example or embodiment can be used with another example or embodiment to yield a still further example or embodiment. Thus, it is intended that the presently described technology covers such modifications and variations as come within the scope of the appended claims and their equivalents.

The terms "upstream" and "downstream" refer to a relative location or direction with respect to fluid flow between an upstream location or source of fluid and a downstream location or end location of the fluid. For example, "upstream" refers to a location that is relatively closer to or in a direction that is toward the upstream location or source of fluid, whereas "downstream" refers to a location that is relatively closer to or in a direction toward the downstream location or end location of the fluid. As used herein, the terms "axial" and "longitudinal" both refer to a direction parallel to the centerline axis of a gas turbine engine (e.g., a turboprop, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to a relative location or direction along a radial line from the outer circumference of the gas turbine engine towards the centerline axis of the gas turbine engine, and "radially outward" refers to a relative location or direction along a radial line from the centerline axis of the gas turbine engine towards the outer circumference of the gas turbine engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/ or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Turbo engines (e.g., turbofan engines, turboprop engines, etc.), such as those used on aircraft, include a fan and a gas turbine engine to drive the fan to produce thrust. The gas turbine engine includes one or more compressor sections. For example, some gas turbine engines include a low pressure compressor section and a high pressure compressor section. Each compressor section may have one or more stages of rotor blades and stator vanes arranged in an alternating sequence in the axial direction.

Some gas turbine engines include inlet guide vanes (IGVs) immediately upstream of the first stage of rotor blades of the compressor. Some gas turbine engine include a first set of IGVs upstream of the low pressure compressor section and a second set of IGVs upstream of the high pressure compressor section. The IGVs are angled to direct the air to flow into the compressor in a swirl direction. The pre-swirled air improves engine efficiency by reducing the amount of work needed from the drive shaft to rotate the first stage of rotor blades. Some gas turbine engines include moveable IGVs, sometimes referred to as variable IGVs (VIGVs). In particular, each IGV is rotatable about its radial axis. The IGVs can be rotated between a more closed position, which increases air swirling, and a more open position, in which air flow is more axial. This ability to vary the IGV angle improves engine efficiency and/or operability at partial load or speed.

However, at partial load or speed of the engine (e.g., 80-95% nominal speed), when the IGVs are relatively closed, the first stage of rotor blades are susceptible to non-synchronous vibration (NSV), which negatively impacts operability and performance. Some known systems address the problem by increasing the ruggedness of the airfoil, but this often leads to decreased efficiency. Further, this first stage of rotor blades is susceptible to stalling. One of the contributing factors causing NSV and stage one stalls is from a lack of flow in the outer span of the stage one rotors near the casing (e.g., at or near the rotor tips) due to the IGVs being closed. In other words, while the IGVs are closed to help swirl the air into the first stage or rotor blades, this closed position also starves the air flow to the rotor tips that are spinning relatively fast and increases the incidence on the airfoil causing them to stall.

Disclosed herein are example IGVs that include two or more portions, where one of the portions is fixed and another portion is moveable. For example, disclosed herein is an IGV that includes an outer radial panel and an inner radial panel. The outer radial panel remains fixed or stationary relative to the casing of the engine, while the inner radial panel is moveable (e.g., rotatable) relative to the outer radial panel and, thus, moveable relative to the casing of the engine. As such, the inner radial panel can be controlled (e.g., opened or closed) to affect the air flow angle, like a typical IGV, but the outer radial panel remains in a fixed position (which is relatively open) to maintain higher axial airflow to the rotor tips, which reduces NSV and improves part speed operability. The example IGVs disclosed herein allow front block to throttle further at part or partial speed, which improves flow to the outer radial area (e.g., the tips) of the first stage of rotor blades and, thus, improves rotor throttling capabilities. The example split IGV design increases inlet corrected mass flow and total pressure ratio compared to known IGV designs in which the entire IGV rotates.

In another example disclosed herein, the IGV includes three portions, including an outer radial panel, an inner radial panel, and a middle panel between the outer radial panel and the inner radial panel. In this example, the outer radial panel and the inner radial panel remain fixed or stationary, while the middle panel is moveable (e.g., rotatable). Fixing the outer radial panel provides the benefits noted above. Further, fixing the inner radial panel helps ensure higher axial flow near the inner radial portions of the rotor blades, which is beneficial to the second and subsequent stages of rotor blades that are typically starved of axial air flow during part speed operation. Thus, the example three portion IGV significantly reduces NSV and improves engine operability.

Also disclosed herein are example stator vanes with two or more portions, where one of the portions is fixed and another portion is moveable (e.g., rotatable). An example stator vane disclosed herein includes an outer radial panel and an inner radial panel. In some examples, the inner radial panel is fixed while the outer radial panel is moveable (e.g., rotatable). As such, the outer radial panel can be opened or closed to affect the swirl to the next rotor stage, while the inner radial panel remains fixed, which helps with hub weakness during part power or part speed conditions.

Referring now to the drawings, FIG. 1 is a schematic cross-sectional view of an example turbofan engine 100 including an example gas turbine engine 102 that can incorporate various examples disclosed herein. The example turbofan engine 100 can be implemented on an aircraft and can therefore be referred to as an aircraft engine. While the examples disclose herein are described in connection with a gas turbine engine on a turbofan-type of engine, the principles of the present disclosure are also applicable to other types or configurations of engines, such as turbojet engines, turbo prop engines, engines without a nacelle, such as unducted fan (UDF) engines, etc. Further, the example principles disclosed herein can be implemented on other types of engines, such as non-aircraft engines (e.g., power generation engines).

As shown in FIG. 1, the turbofan engine 100 includes the gas turbine engine 102, an outer bypass duct 104 (sometimes referred to as a nacelle or fan duct), and a fan section 106. The gas turbine engine 102 and the fan section 106 are disposed at least partially in the outer bypass duct 104. The gas turbine engine 102 is disposed downstream from the fan section 106 and drives the fan section 106 to produce forward thrust.

As shown in FIG. 1, the turbofan engine 100 and/or the gas turbine engine 102 define a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the turbofan engine 100, such as to the left in FIG. 1, while the term "rearward" refers to a direction along the centerline axis 108 in the opposite direction, such as to the right in FIG. 1.

The gas turbine engine 102 includes a substantially tubular casing 110 (which may also be referred to as a mid-casing) that defines an annular inlet 112. The casing 110 of the gas turbine engine 102 can be formed from a single casing or multiple casings. The casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124.

The gas turbine engine 102 includes a high pressure shaft 126 ("HP shaft 126") that drivingly couples the HP turbine 120 and the HP compressor 116. The gas turbine engine 102 also includes a low pressure shaft 128 ("LP shaft 128") that drivingly couples the LP turbine 122 and the LP compressor 114. The LP shaft 128 also couples to a fan shaft 130.

The fan section 106 includes a plurality of fan blades 132 that are coupled to and extend radially outward from the fan shaft 130. In some examples, the LP shaft 128 may couple directly to the fan shaft 130 (e.g., a direct-drive configuration). In alternative configurations, the LP shaft 128 may couple to the fan shaft 130 via a reduction gear 134 (i.e., an indirect-drive or geared-drive configuration). While in this example the gas turbine engine 102 includes two compressors and two turbines, in other examples, the gas turbine engine 102 may only include one compressor and one turbine. Further, in other examples, the gas turbine engine 102 can include more than two compressors and turbines. In such examples, the gas turbine engine 102 may include more than two drive shafts or spools.

As illustrated in FIG. 1, during operation of the turbofan engine 100, air 136 enters an inlet portion 138 of the turbofan engine 100. The air 136 is accelerated by the fan blades 132 (and, thus, is sometimes considered a low pressure compressor). A first portion 140 of the air 136 flows into a bypass airflow passage 142, while a second portion 144 of the air 136 flows into the inlet 112 of the gas turbine engine 102 (and, thus, into the LP compressor 114). One or more sequential stages of LP compressor stator vanes 146 and LP compressor rotor blades 148 coupled to the LP shaft 128 progressively compress the second portion 144 of the air 136 flowing through the LP compressor 114 en route to the HP compressor 116. Next, one or more sequential stages of HP compressor stator vanes 150 and HP compressor rotor blades 152 coupled to the HP shaft 126 further compress the second portion 144 of the air 136 flowing through the HP compressor 116. This provides compressed air 154 to the combustion section 118 where it mixes with fuel and burns to provide combustion gases 156. In some examples, the gas turbine engine 102 includes a set of inlet guide vanes in the flow passageway immediately upstream of the LP compressor 114. The inlet guide vanes are used to help swirl the air to the first stage of rotor blades of the LP compressor 114. Further, in some examples, the gas turbine engine 102 includes another set of inlet guide vanes in the flow passageway immediately upstream of the HP compressor 116. The inlet guide vanes similarly help swirl the air to the first stage of rotor blades of the HP compressor 116.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the fan shaft 130. The combustion gases 156 then exit the gas turbine engine 102 through the exhaust section 124 thereof. The combustion gases 156 mix with the first portion 140 of the air 136 from the bypass airflow passage 142. The combined gases exit an exhaust nozzle 166 (e.g., a converging/diverging nozzle) of the bypass airflow passage 142 to produce propulsive thrust.

Figure 2:
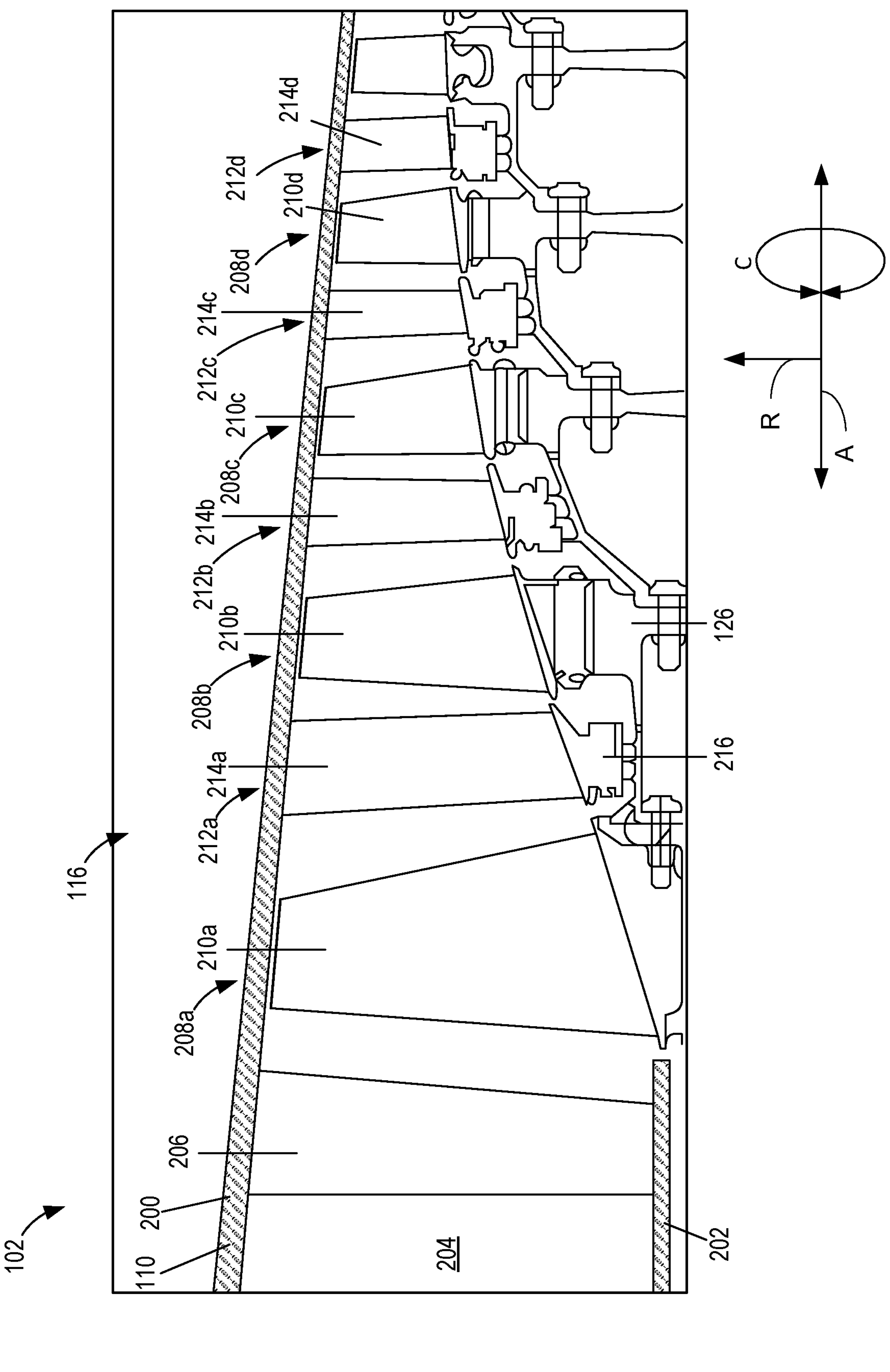
FIG. 2 is an enlarged view of a section of a compressor of the example gas turbine engine of FIG. 1.

FIG. 2 is an enlarged view showing a portion of the casing 110 and the HP compressor 116 of the gas turbine engine 102 of FIG. 1. The casing 110 includes an outer radial wall 200 and an inner radial wall 202 that define a flow passageway 204 to direct air to the HP compressor 116. As shown in FIG. 2, the gas turbine engine 102 includes a plurality of inlet guide vanes 206 (one of which is referenced in FIG. 2) in the flow passageway 204 upstream of the first stage of the rotor blades of the HP compressor 116. The inlet guide vanes 206 are distributed circumferentially in the flow passageway 204. The inlet guide vanes 206 are oriented radially (e.g., in the radial direction R depicted in FIG. 2). In particular, each of the inlet guide vanes 206 extends between the outer radial wall 200 and the inner radial wall 202. The inlet guide vanes 206 are used to control the mass flow and generate pre-swirl of the air prior to the first stage rotors of the HP compressor 116. In some examples, the inlet guide vanes 206 are fixed relative to the casing 110. In other examples the inlet guide vanes 206 may have one or more portions that are moveable (e.g., rotatable) to vary the mass air flow and/or air flow direction, examples of which are disclosed in further detail herein.

As disclosed above, the HP compressor 116 includes a plurality of alternating stages of rotor blades and stator vanes that extend radially in the flow passageway 204. For example, as shown in FIG. 2, the HP compressor 116 includes a first stage 208*a* of rotor blades 210*a*, a second stage 208*b* of rotor blades 210*b*, a third stage 208*c* of rotor blades 210*c*, a fourth stage 208*d* of rotor blades 210*d*, and so forth. The stages 208*a*-208*d* are spaced apart in the axial direction (A). The rotor blades 210*a*-210*d* are coupled to and extend radially outward from the HP shaft 126. In particular the root end of each of the rotor blades 210*a*-210*d* is coupled to the HP shaft 126. The distal end or tip of each of the rotor blades 210*a*-210*d* is close to but not touching the outer radial wall 200. As such, the rotor blades 210*a*-210*d* span substantially the entire radial dimension of the flow passageway 204. The rotor blades 210*a*-210*d* of each stage are distributed circumferentially around the HP shaft 126. During operation of the gas turbine engine 102, the rotor blades 210*a*-210*d* rotate with the HP shaft 126 to compress or increase the speed of the air through the flow passageway 204, which progressively increases the pressure of the air, before arriving at the combustor 118 (FIG. 1). While four example stages are shown, it is understood the HP compressor 116 can include any number of stages of rotor blades, and each stage can include any number of rotor blades.

As shown in FIG. 2, the HP compressor 116 includes a first stage 212*a* of stator vanes 214*a* between the first and second stages 208*a*, 208*b* of rotor blades 210*a*, 210*b*, a second stage 212*b* of stator vanes 214*b* between the second and third stages 208*b*, 208*c* of rotor blades 210*b*, 210*c*, a third stage 212*c* of stator vanes 214*c* between the third and fourth stages 208*c*, 208*d* of rotor blades 210*c*, 210*d*, a fourth stage 212*d* of stator vanes 214*d* downstream of the fourth stage 208*d* of rotor blades 210*d*, and so forth. The stages 212*a*-212*d* are spaced apart in the axial direction (A). Each of the stages 212*a*-212*d* of stator vanes 214*a*-214*d* redirects or angle the air flow prior to the subsequent rotor stage. The stator vanes 214*a*-214*d* of each stage are distributed circumferentially around the casing 110. The stator vanes 214*a*-214*d* are coupled to and extend radially inward from the outer radial wall 200. For example, as shown in FIG. 2, the stator vanes 214*a* of the first stage 212*a* extend between the outer radial wall 200 of the casing 110 and an inner shroud 216 carried by or coupled to the inner radial ends of the stator vanes 214*a*. In some examples, the stator vanes 214*a*-214*d* are fixed relative to the casing 110. In other examples, the stator vanes 214*a*-214*d* may have one or more portions that are moveable (e.g., rotatable) to vary the mass air flow and/or air flow direction, examples of which are disclosed in further detail herein. While four example stator stages are shown, it is understood the HP compressor 116 can include any number of stator stages, and each stage can include any number of stator vanes.

The LP compressor 114 (FIG. 1) similarly includes a plurality of alternating stages of rotor blades and stator vanes. In some examples, the gas turbine engine 102 includes another set of inlet guide vanes in the flow passageway 204 immediately upstream of the first stage of rotor blades of the LP compressor 114.

Figure 3:
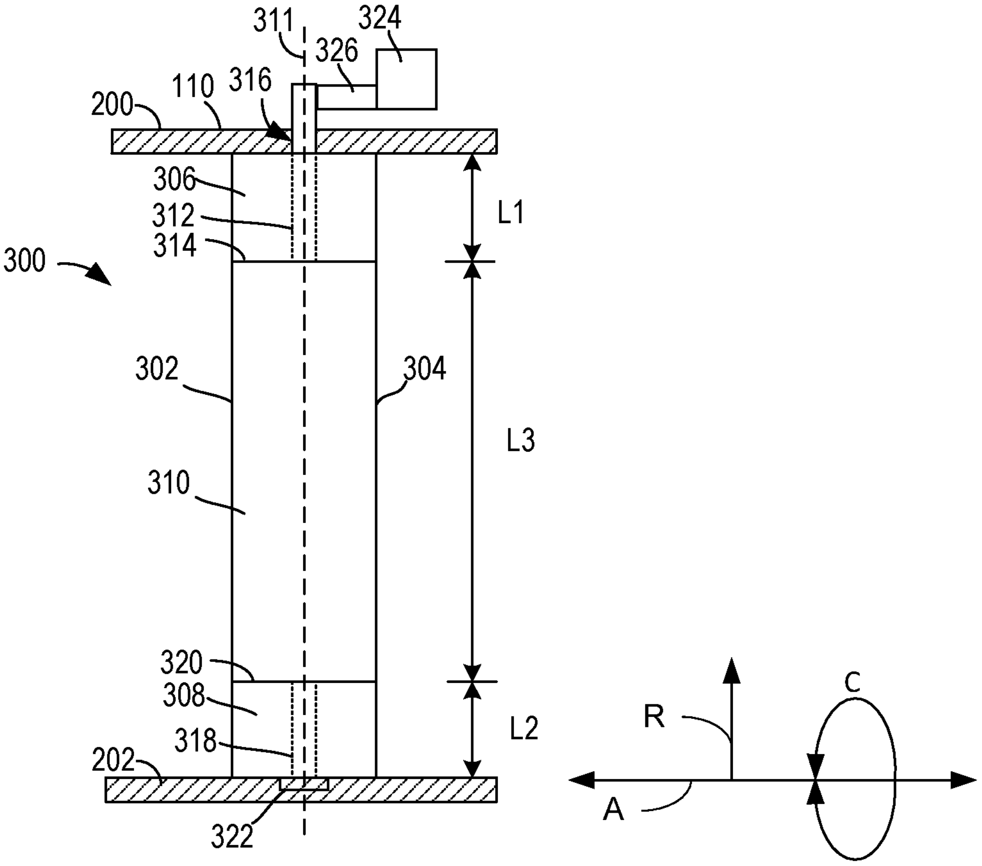
FIG. 3 is a schematic of an example inlet guide vane having three portions and which can be implemented in the example gas turbine engine of FIG. 1.

FIG. 3 illustrates an example inlet guide vane 300 that can be implemented as the inlet guide vanes 206 of FIG. 2. In other words, each of the inlet guide vanes 206 can be implemented as the inlet guide vane 300 of FIG. 3. The inlet guide vane 300 extends or spans between the outer radial wall 200 and the inner radial wall 202 of the casing 110. The inlet guide vane 300 has a leading edge 302 and a trailing edge 304.

In the illustrated example, the inlet guide vane 300 includes or is divided into three portions, including an outer radial panel 306, an inner radial panel 308, and a middle panel 310 between the outer radial panel 306 and the inner radial panel 308. The panels 306, 308, 310 may also be referred to as portions. In this example, the outer and inner radial panels 306, 308 are fixed or stationary relative to the casing 110, while the middle panel 310 is rotatable relative to the outer and inner radial panels 306, 308. For example, as shown in FIG. 3, the outer radial panel 306 is coupled to and extends radially inward (e.g., in the downward direction of FIG. 3) from the outer radial wall 200. Similarly, the inner radial panel 308 is coupled to and extends radially outward (e.g., in the upward direction of FIG. 3) from the inner radial wall 202. In this example, the outer radial panel 306 is fixed to the outer radial wall 200, and the inner radial panel 308 is fixed to the inner radial wall 202. For example, the outer and inner radial panels 306, 308 may be integrally constructed with the outer and inner radial walls 200, 202 and/or otherwise fixedly coupled (e.g., via welding, via threaded fasteners, etc.) to the outer and inner radial walls 200, 202. As such, the outer radial panel 306 and the inner radial panel 308 are not moveable. However, in this example, the middle panel 310 is rotatable relative to the outer radial panel 306 and the inner radial panel 308 and, thus, rotatable relative to the casing 110. For example, the middle panel 310 is rotatable about a longitudinal or centerline axis 311 of the inlet guide vane 300 extending in the radial direction. The middle panel 310 can be rotated between a closed position and an open position. This enables the air along the middle section of the flow passageway 204 (FIG. 2) to be angled or swirled, while the air along the outer and inner radial sections can maintain a higher flow in the axial direction.

In the illustrated example of FIG. 3, the outer radial panel 306 has a first radial length L1, the inner radial panel 308 has a second radial length L2, and the middle panel 310 has a third radial length of L3. The summation of the first, second, and third radial lengths L1, L2, L3 corresponds to the radial span between the outer radial wall 200 and the inner radial wall 202 at the location of the inlet guide vane 300. In the illustrated example, the third radial length L3 is greater than the first radial length L1 and the second radial length L2. In some examples, the third radial length L3 is larger than a summation of the first and second radial lengths L1, L2. As such, the middle panel 310, which is moveable, makes up the largest portion of the inlet guide vane 300. In some examples, the first radial length L1 and the second radial length L2 are the same. In other examples, the first radial length L1 and the second radial length L2 are different. In some examples, the first radial length L1 of the outer radial panel 306 and the second radial length L2 of the inner radial panel 308 are each from about 5% to about 30% of the total radial span between the outer radial wall 200 and the inner radial wall 202. For example, the first radial length L1 may be about 5% of the total radial span, the second radial length L2 may be about 5% of the total radial span, and the third radial length L3 may be about 90% of the total radial span. As another example, the first radial length L1 may be about 30% of the total radial span, the second radial length L2 may be about 30% of the total radial span, and the third radial length L3 may be about 40% of the total radial span. This range ensures there is a sufficient amount of rotatable section to still effectively swirl the air along the middle section of the flow passageway 204 (FIG. 2) and also ensures a sufficient amount of fixed sections to maintain a higher flow in the axial direction along the inner and outer radial sections of the flow passageway 204. In some examples, the ratio is dependent on the size of the aerodynamic separation at the adjacent rotor blade (e.g., rotating stall cell size).

To rotate the middle panel 310, the inlet guide vanes includes two shafts that extend through the outer and inner radial panels 306, 308. For example, as shown in FIG. 3, the inlet guide vane 300 has a first shaft 312 that is coupled to a first end 314 of the middle panel 310. The first shaft 312 extends through the outer radial panel 306 and through an opening 316 in the outer radial wall 200. For example, the outer radial panel 306 may be hollow or have a central channel for the first shaft 312. Similarly, the inlet guide vane 300 has a second shaft 318 that is coupled to a second end 320 of the middle panel 310. The second shaft 318 extends through the inner radial panel 308. The inner radial panel 308 may be hollow or have a central channel for the second shaft 318. The second shaft 318 is rotatably supported by a trunnion or bearing 322 on the inner radial wall 202, which enables the second shaft 318 to rotate smoothly. Additionally or alternatively, a trunnion or bearing can be provided in/on the inner radial panel 308 (e.g., on the end of the inner radial panel 308 facing the second end 320 of the middle panel 310). In the illustrated example, the gas turbine engine 102 includes an actuator 324 to rotate the first shaft 312, which causes rotation of the middle panel 310. In this example, the first shaft 312 is coupled to a unison ring 326. In some examples, the unison ring 326 is coupled to all of the shafts of all the inlet guide vanes. The actuator 324 can be activated to move (e.g., rotate) the unison ring 326, which moves (e.g., rotates) all of the middle panels of the inlet guide vanes in unison. In other examples, the actuator 324 can be connected to the first shaft 312 in other configurations (e.g., via a direct connection, via a gear train). In some examples, the actuator 324 is a hydraulic actuator or pneumatic actuator. In other examples, the actuator 324 can be another type of actuator (e.g., an electrical actuator, a solenoid, a motor).

Figure 4A:
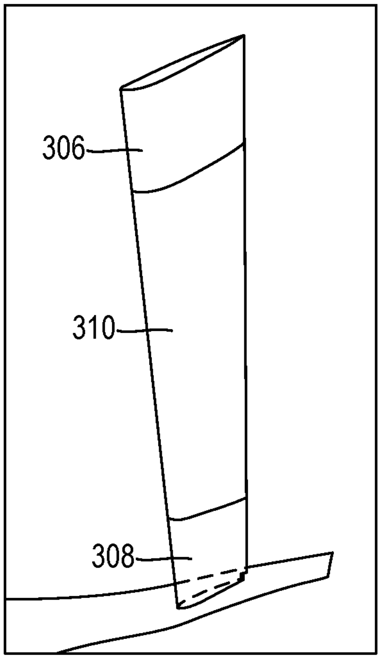
FIG. 4A is a perspective view of the example inlet guide vane of FIG. 3 in which the three portions are aligned in an open position.
Figure 4B:
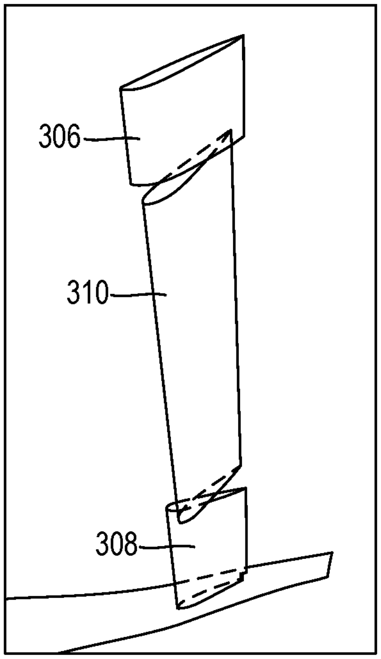
FIG. 4B is a perspective view of the example inlet guide vane of FIG. 4A in which the middle portion has been rotated relative to the outer and inner radial panels to a closed position.

FIG. 4A is a perspective view of the inlet guide vane 300 in which the middle panel 310 is aligned with the outer and inner radial panels 306, 308. For example, the leading edges of all three portions are aligned. This position may be referred to as an open position. FIG. 4B is a perspective view of the inlet guide vane 300 in which the middle panel 310 has been rotated relative to the outer and inner radial panels 306, 308. In particular, the middle panel 310 has been rotated to a closed position. The outer radial panel 306 and the inner radial panel 308 remain fixed at the open position. In some examples, even in the open position, the outer and inner radial panels 306, 308 are angled relative to the axial direction. For example, the outer radial panel 306 and the inner radial panel 308 may be angled at about 200 relative to the axial direction. The middle panel 310 may be rotatable between the same angle, (e.g., about 20°), and another angle corresponding to the closed position, such as about 85°. As shown in FIGS. 4A and 4B, the inlet guide vane 300 has an airfoil cross-sectional shape. In other examples, the inlet guide vane 300 can have a different cross-sectional shape.

Figure 5:
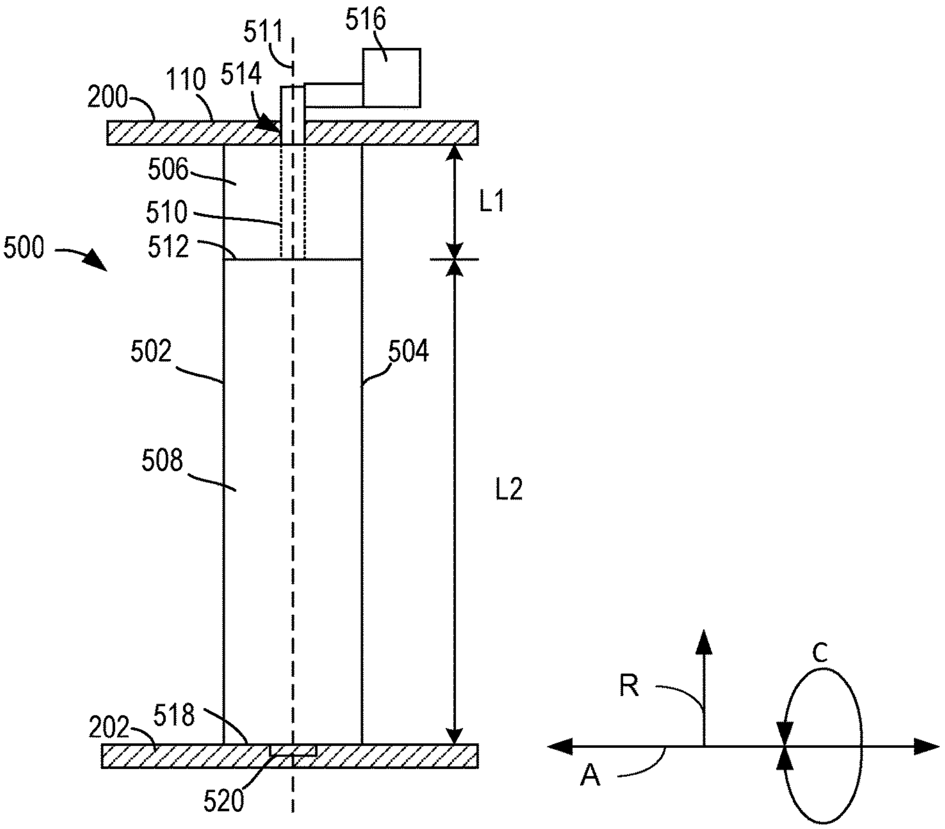
FIG. 5 is a schematic of another example inlet guide vane having two portions and which can be implemented in the example gas turbine engine of FIG. 1.

FIG. 5 illustrates another example inlet guide vane 500 that can be implemented as the inlet guide vanes 206 of FIG. 2. In other words, each of the inlet guide vanes 206 can be implemented as the inlet guide vane 500 of FIG. 5. The inlet guide vane 500 extends or spans between the outer radial wall 200 and the inner radial wall 202 of the casing 110. The inlet guide vane 500 has a leading edge 502 and a trailing edge 504.

In the illustrated example, the inlet guide vane 500 includes two portions, including an outer radial panel 506 and an inner radial panel 508. The outer radial panel 506 is coupled to and extends radially inward (e.g., in the downward direction of FIG. 5) from the outer radial wall 200. The inner radial panel 508 extends between the outer radial panel 506 and the inner radial wall 202. In this example, the outer radial panel 506 is fixed, while the inner radial panel 508 is rotatable (e.g., about a longitudinal or centerline axis 511 of the inlet guide vane 500 extending in the radial direction) relative to the outer radial panel 506. This enables the air along the middle and radially inner sections of the flow passageway 204 (FIG. 2) to be angled or redirected without affecting the angle of the air at the radially outer section.

In the illustrated example, the outer radial panel 506 has a first radial length L1 and the inner radial panel 508 has a second radial length L2. In the illustrated example, the second radial length L2 is larger than first radial length L1. As such, the inner radial panel 508, which is moveable, makes up the largest portion of the inlet guide vane 500. In some examples, the first radial length L1 of the outer radial panel 506 is from about 5% to about 30% of the total radial span between the outer radial wall 200 and the inner radial wall 202.

Similar to the inlet guide vane 300, the inlet guide vane 500 includes a shaft 510 coupled to a first end 512 of the inner radial panel 508. The shaft 510 extends through the outer radial panel 506 and through an opening 514 in the outer radial wall 200. The shaft 510 can be rotated by an actuator 516. A second end 518 of the inner radial panel 508 is rotatably supported by a trunnion or bearing 520 on the inner radial wall 202.

Figure 6A:
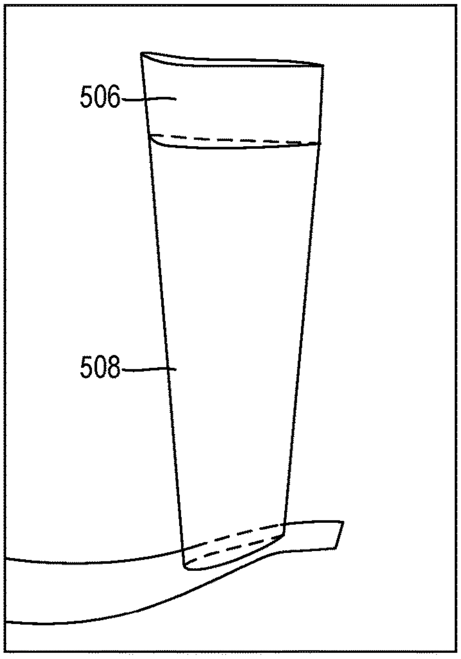
FIG. 6A is a perspective view of the example inlet guide vane of FIG. 5 in which the two portions are aligned in an open position.
Figure 6B:
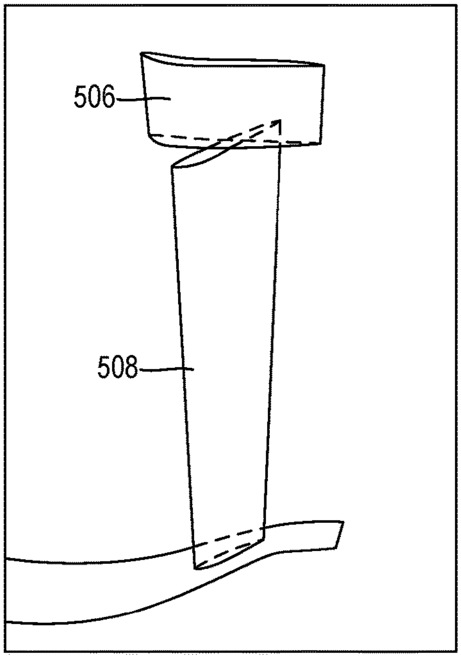
FIG. 6B is a perspective view of the example inlet guide vane of FIG. 6A in which the inner radial portion has been rotated relative to the outer radial portion to a closed position.

FIG. 6A is a perspective view of the inlet guide vane 500 in which the inner radial panel 508 is aligned with the outer radial panel 506. For example, the leading edges of the two portions are aligned. This position may be referred to as an open position. FIG. 6B is a perspective view of the inlet guide vane 500 in which the inner radial panel 508 has been rotated relative to the outer radial panel 506 to a closed position.

Figure 7:
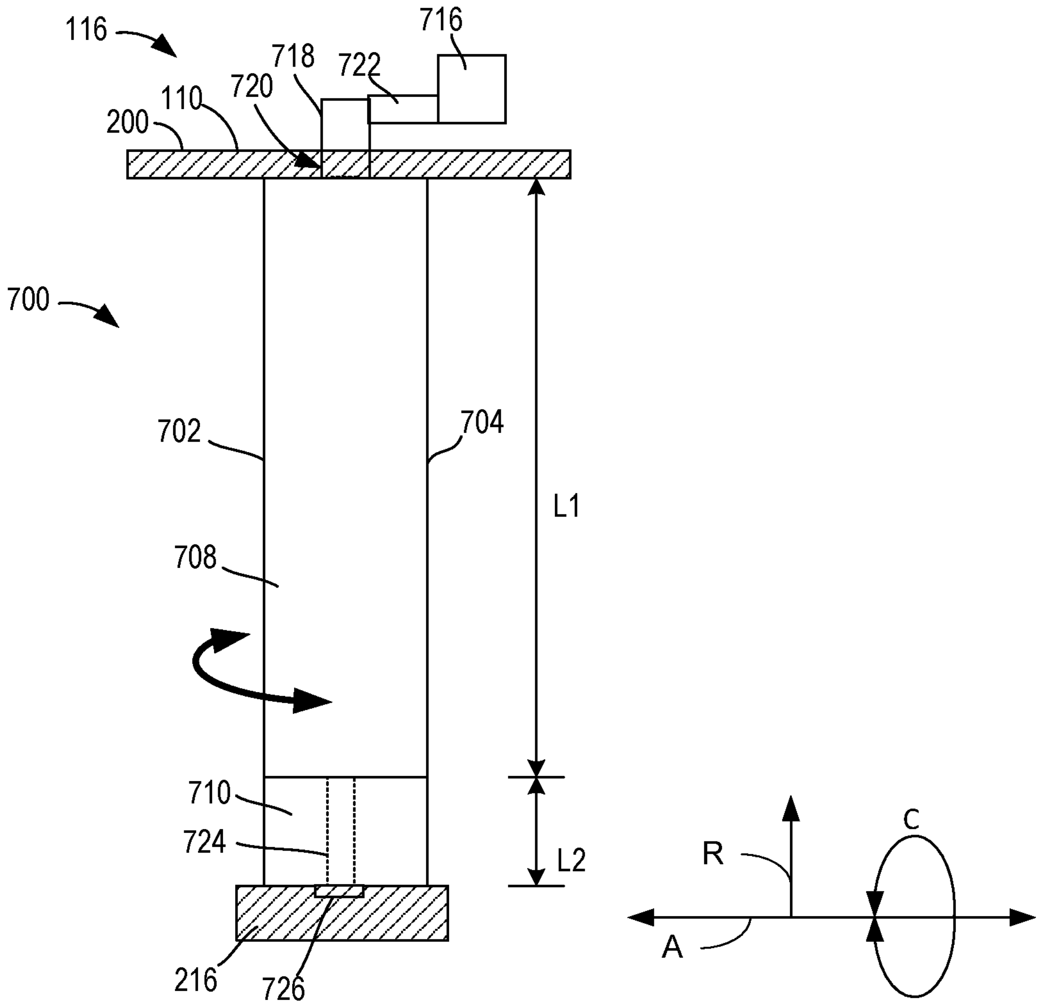
FIG. 7 is a schematic of an example stator vane having two portions and which can be implemented in the example gas turbine engine of FIG. 1.

In some examples, similar to the inlet guide vanes 300, 500 disclosed above, one or more of the stator vanes can be constructed of one or more portions that are fixed and one or more portions that are moveable (e.g., rotatable). For example, FIG. 7 illustrates an example stator vane 700. In some examples, the stator vane 700 is implemented as the stator vanes 214*a* of the first stage 212*a*. In other words, each of the stator vanes 214*a* can be implemented as the stator vane 700 of FIG. 7. The stator vane 700 has a leading edge 702 and a trailing edge 704. As shown in FIG. 7, the HP compressor 116 (FIG. 2) includes the inner shroud 216, which is a circular or annular member. The inner shroud 216 is disposed in the flow passageway 204 (FIG. 2) and encircles or surrounds the HP shaft 126 (FIG. 2) but does not physically touch the HP shaft 126. As shown in FIG. 7, the stator vane 700 extends radially between the outer radial wall 200 and the inner shroud 216.

In the illustrated example, the stator vane 700 includes an outer radial panel 708 and an inner radial panel 710. In this example, the inner radial panel 710 is fixed or stationary relative to the outer radial wall 200 of the casing 110, while the outer radial panel 708 is rotatable relative to the inner radial panel 710 and, thus, rotatable relative to the outer radial wall 200 of the casing 110. This enables the outer radial panel 708 to angle or redirect the air flow, while still allowing the inner radial panel 710 to remain fixed and provide structural rigidity to the inner portion of the stator vane 700, which is beneficial during part speed conditions.

As disclosed above, the outer radial panel 708 is rotatable. For example, the outer radial panel 708 is rotatable about a longitudinal or central axis extending in the radial direction. In the illustrated example, the HP compressor 116 includes an actuator 716 to rotate the outer radial panel 708 of the stator vane 700. The stator vane 700 includes a first shaft 718 that is coupled to the outer radial panel 708 and extends through an opening 720 in the outer radial wall 200. The actuator 716 can rotate the first shaft 718, which causes rotation of the outer radial panel 708. In some examples, a unison ring 722 is coupled to all of the shafts of the stator vanes. The actuator 716 can rotate the unison ring 722 to rotate all of the outer radial panels of the stator vanes in unison. In other examples, the actuator 716 can be connected to the first shaft 718 in other configurations (e.g., via a direct connection, via a gear train). In some examples, the actuator 716 is a hydraulic actuator or pneumatic actuator. In other examples, the actuator 716 can be another type of actuator (e.g., an electrical actuator, a solenoid, a motor). In the illustrated example, the stator vane 700 includes a second shaft 724 that is coupled to the outer radial panel 708 and extends through the inner radial panel 710. A trunnion or bearing 726 can be provided on the inner shroud 216 to enable the second shaft 724 (and, thus, the outer radial panel 708) to rotate smoothly. Additionally or alternatively, a trunnion or bearing can be provided on the inner radial panel 710.

In the illustrated example, the outer radial panel 708 has a first radial length L1 and the inner radial panel 710 has a second radial length L2. In the illustrated example, the first radial length L1 is larger than the second radial length L2. As such, the outer radial panel 708, which is moveable, makes up the largest portion of the stator vane 700. In some examples, the second radial length L2 of the inner radial panel 710 is from about 5% to about 30% of the total radial span or length of the stator vane 700.

Figure 8:
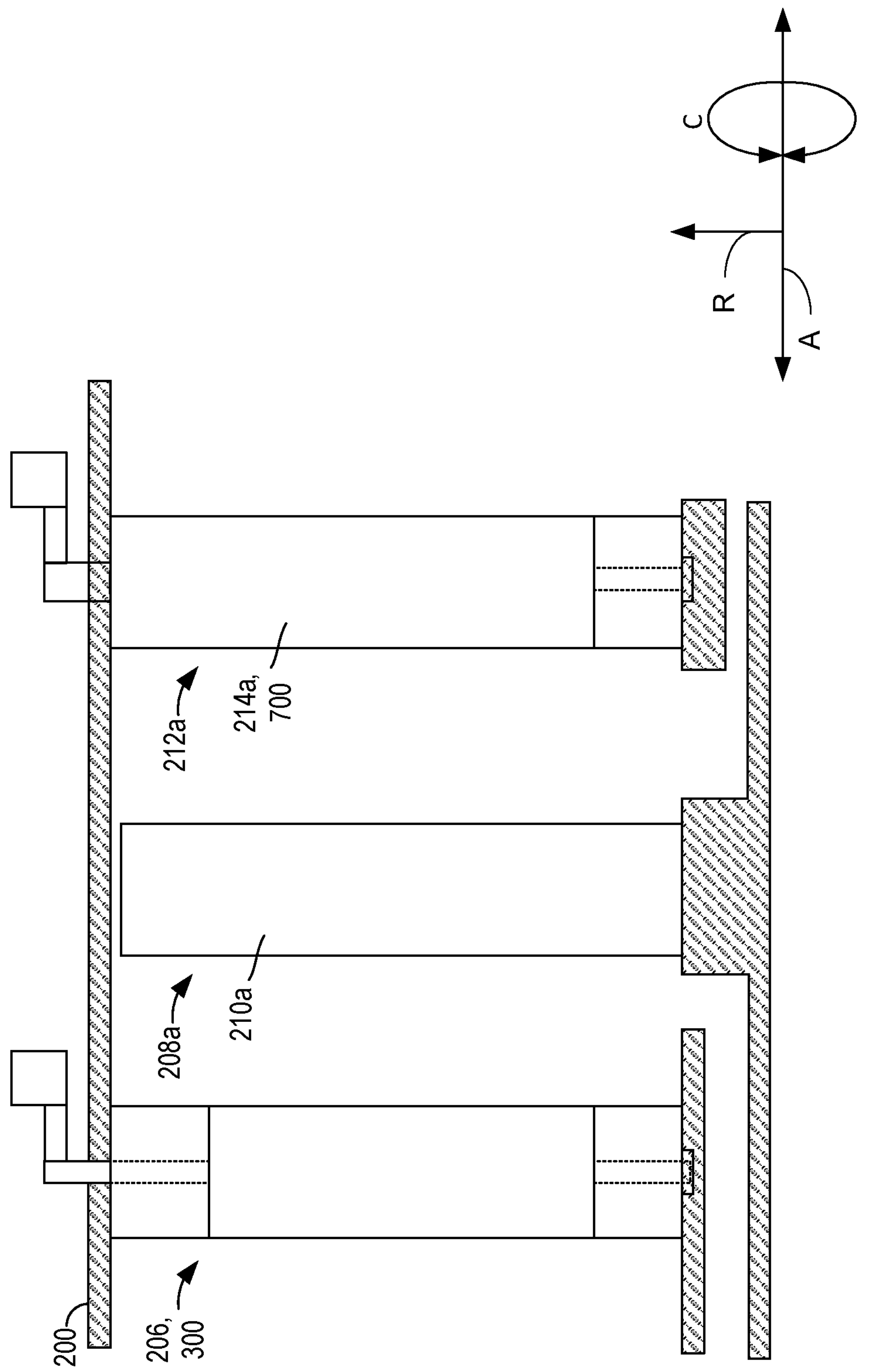
FIG. 8 is a schematic of the example compressor of FIG. 2 showing a combination of the example inlet guide vane of FIG. 3 and the example stator vane of FIG. 7.

In some examples, inlet guide vanes having fixed and rotatable portions can be implemented in the gas turbine engine 102 in combination with stator vanes having fixed and rotatable portions. For example, FIG. 8 shows an example portion of the gas turbine engine 102 showing the inlet guide vanes 206, the first stage 208*a* of rotor blades 210*a*, and the first stage 212*a* of stator vanes 214*a*. In this example, the inlet guide vanes 206 are implemented as the inlet guide vane 300 shown in FIG. 3. Therefore, each of the inlet guide vanes 206 includes an outer radial panel 306 and an inner radial panel 308 that are fixed or stationary, and a middle panel 310 that is rotatable. Further, the stator vanes 214*a* are implemented as the stator vane 700 shown in FIG. 7. As such, each of the stator vanes 214*a* includes an outer radial panel 708 that is rotatable and an inner radial panel 710 that is fixed or stationary. The combination of the inlet guide vane 300 and the stator vane 700 improves engine operability and reduces NSV. In other examples, the inlet guide vanes 206 can be implemented as the inlet guide vanes 500 shown in FIG. 5.

While the inlet guide vanes 300, 500 are described in connection with the inlet guide vanes 206 upstream of the HP compressor 116, the inlet guide vanes 300, 500 can be similarly implemented as the inlet guide vanes that are upstream of the LP compressor 114. Further, the example stator vane 700 can be implemented as the first stage of stator vanes of the LP compressor 114. Thus, any of the example inlet guide vanes and/or stator vanes disclosed herein can be similarly implemented in connection with the LP compressor 114.

From the foregoing, it can be appreciated that example inlet guide vanes having a portion that are rotatable, to enable the inlet guide vanes to vary the swirl of air to the rotors, and an outer radial portion that is fixed, which improves rotor tip flow when the rotatable portion is closed or partially closed. In particular, the outer radial portion is fixed at an open position so that the rotor tips of the first stage of rotor blades have improved flow field and are less likely to separate and cause NSV and part speed stall. This significantly improves engine operability. Also disclosed herein are example stator vanes with a fixed portion and a rotatable portion. The fixed portion helps to improve structural integrity near the hub or inner radial portion of the stator vane.

Further examples and example combinations thereof are provided by the subject matter of the following clauses:

A gas turbine engine comprising: a casing defining a flow passageway to a compressor, the casing including an outer radial wall and an inner radial wall, the compressor including alternating stages of rotor blades and stator vanes in the flow passageway; and an inlet guide vane in the flow passageway upstream of a first stage of rotor blades of the compressor, the inlet guide vane extending between the outer radial wall and the inner radial wall, the inlet guide vane including: an outer radial panel coupled to the outer radial wall; an inner radial panel coupled to the inner radial wall; and a middle panel between the outer radial panel and the inner radial panel, the middle panel rotatable relative to the outer and inner radial panels.

The gas turbine engine of any preceding clause, wherein the outer radial panel and the inner radial panel are fixed relative to the casing.

The gas turbine engine of any preceding clause, wherein the outer radial panel has a first radial length, the inner radial panel has a second radial length, and the middle panel has a third radial length.

The gas turbine engine of any preceding clause, wherein the third radial length is greater than the first radial length and the second radial length.

The gas turbine engine of any preceding clause, wherein the first radial length and the second radial length are the same.

The gas turbine engine of any preceding clause, wherein the first radial length and the second radial length are different.

The gas turbine engine of any preceding clause, wherein the inlet guide vane includes a first shaft coupled to a first end of the middle panel, the first shaft extending through the outer radial panel and through an opening in the outer radial wall.

The gas turbine engine of any preceding clause, further including an actuator to rotate the first shaft to cause rotation of the middle panel.

The gas turbine engine of any preceding clause, further including a second shaft coupled to a second end of the middle panel, the second shaft extending through the inner radial panel, the second shaft rotatably supported by a trunnion or bearing on the inner radial wall.

The gas turbine engine of any preceding clause, wherein the outer radial panel is a first outer radial panel and the inner radial panel is a first inner radial panel, wherein the compressor includes a stator vane, the stator vane including: a second inner radial panel; and a second outer radial panel that is rotatable relative to second inner radial panel.

The gas turbine engine of any preceding clause, wherein the second inner radial panel is fixed relative to the casing.

The gas turbine engine of any preceding clause, wherein the stator vane includes a first shaft coupled to the second outer radial panel, the first shaft extending through an opening in the outer radial wall.

The gas turbine engine of any preceding clause, further including an actuator to rotate the first shaft to cause rotation of the second outer radial panel.

The gas turbine engine of any preceding clause, further including a second shaft coupled to the second outer radial panel, the second shaft extending through the second inner radial panel and rotatably coupled to an inner shroud.

The gas turbine engine of any preceding clause, wherein the inlet guide vane has an airfoil cross-sectional shape.

A gas turbine engine comprising: a casing defining a flow passageway to a compressor, the casing including an outer radial wall and an inner radial wall, the compressor including alternating stages of rotor blades and stator vanes in the flow passageway; inlet guide vanes in the flow passageway upstream of a first stage of rotor blades of the compressor, the inlet guide vanes extending between the outer radial wall and the inner radial wall; and a first stage of stator vanes of the compressor, the stator vanes extending radially inward from the outer radial wall, each of the stator vanes including: an outer radial panel that is rotatable relative to the casing; and an inner radial panel that is fixed relative to the casing.

The gas turbine engine of any preceding clause, further including an inner shroud, and wherein inner radial ends of the stator vanes are coupled to the shroud.

The gas turbine engine of any preceding clause, further including an actuator to rotate the outer radial panel of each of the stator vanes.

The gas turbine engine of any preceding clause, further including a unison ring, the actuator to move the unison ring to cause rotation of the outer radial panel of each of the stator vanes.

The gas turbine engine of any preceding clause, wherein at least a portion of the inlet guide vane is rotatable relative to the casing.

An inlet guide vane to be disposed in a flow passageway of a gas turbine engine upstream of a compressor, the inlet guide vane comprising: an outer radial panel; an inner radial panel; and a middle panel between the outer radial panel and the inner radial panel, wherein the middle panel is rotatable relative to the outer and inner radial panels.

An inlet guide vane to be disposed in a flow passageway of a gas turbine engine upstream of a compressor, the inlet guide vane comprising: an outer radial panel; and an inner radial panel, wherein the inner radial panel is rotatable relative to the outer radial panel.

A stator vane to be disposed in a compressor of a gas turbine engine, the stator vane comprising: an outer radial panel; and an inner radial panel, wherein the outer radial panel is rotatable relative to the inner radial panel.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A gas turbine engine comprising:

a casing defining a flow passageway to a compressor, the casing including an outer radial wall and an inner radial wall, the compressor including alternating stages of rotor blades and stator vanes in the flow passageway; and an inlet guide vane in the flow passageway upstream of a first stage of the rotor blades of the compressor, the inlet guide vane extending between the outer radial wall and the inner radial wall, the inlet guide vane including:

an outer radial panel non-rotatably coupled to the outer radial wall;

an inner radial panel non-rotatably coupled to the inner radial wall; and a middle panel between the outer radial panel and the inner radial panel, the middle panel rotatable relative to the outer and inner radial panels.

2. The gas turbine engine of claim 1, wherein the outer radial panel has a first radial length, the inner radial panel has a second radial length, and the middle panel has a third radial length.

3. The gas turbine engine of claim 2, wherein the third radial length is greater than the first radial length and the second radial length.

4. The gas turbine engine of claim 3, wherein the first radial length and the second radial length are the same.

5. The gas turbine engine of claim 3, wherein the first radial length and the second radial length are different.

6. The gas turbine engine of claim 1, wherein the inlet guide vane includes a first shaft coupled to a first end of the middle panel, the first shaft extending through the outer radial panel and through an opening in the outer radial wall.

7. The gas turbine engine of claim 6, further including an actuator to rotate the first shaft to cause rotation of the middle panel.

8. The gas turbine engine of claim 7, further including a second shaft coupled to a second end of the middle panel, the second shaft extending through the inner radial panel, the second shaft rotatably supported by a trunnion or bearing on the inner radial wall.

9. The gas turbine engine of claim 1, wherein the outer radial panel is a first outer radial panel and the inner radial panel is a first inner radial panel, wherein a first stator vane of the stator vanes includes:

a second inner radial panel; and a second outer radial panel that is rotatable relative to second inner radial panel.

10. The gas turbine engine of claim 9, wherein the second inner radial panel is fixed relative to the casing.

11. The gas turbine engine of claim 10, wherein the first stator vane includes a first shaft coupled to the second outer radial panel, the first shaft extending through an opening in the outer radial wall.

12. The gas turbine engine of claim 11, further including an actuator to rotate the first shaft to cause rotation of the second outer radial panel.

13. The gas turbine engine of claim 12, further including a second shaft coupled to the second outer radial panel, the second shaft extending through the second inner radial panel and rotatably coupled to an inner shroud.

14. The gas turbine engine of claim 1, wherein the inlet guide vane has an airfoil cross-sectional shape.

* * * * *